No. 613,940. Patented Nov. 8, 1898.
A. RINGBORG.
FOOT PROPELLED SLED.
(Application filed Dec. 31, 1897.)
(No Model.)
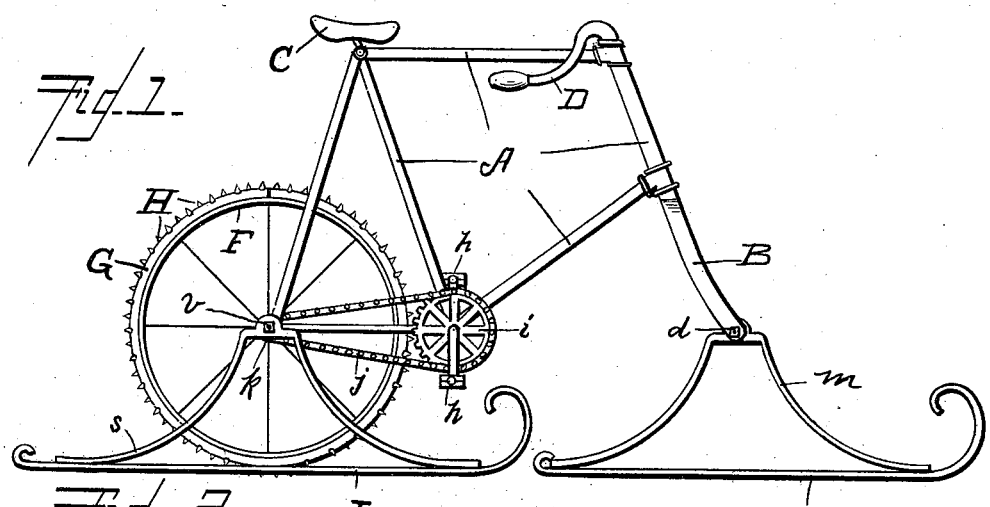
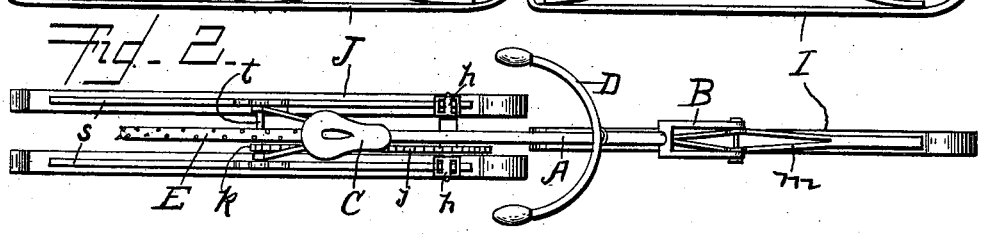
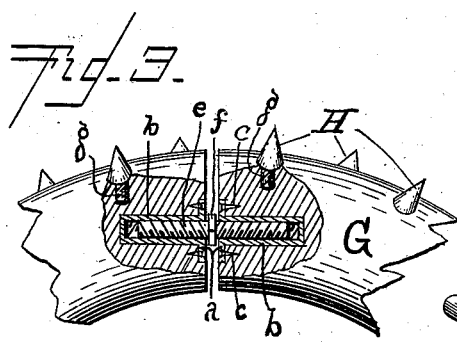
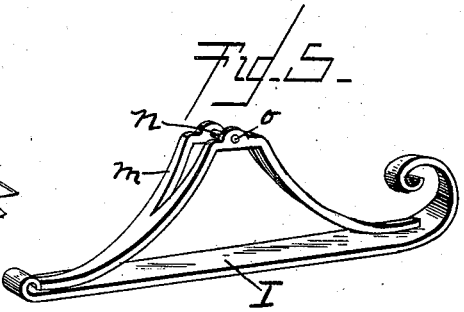
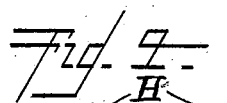
Witnesses.
C. S. Frye
Wm. M. Dunlap
Inventor.
Axel Ringborg
By Hebw S. Paramore,
Attorney.

UNITED STATES PATENT OFFICE.

AXEL RINGBORG, OF ALEXANDRIA, MINNESOTA.

FOOT-PROPELLED SLED.

SPECIFICATION forming part of Letters Patent No. 613,940, dated November 8, 1898.

Application filed December 31, 1897. Serial No. 664,829. (No model.)

*To all whom it may concern:*

Be it known that I, AXEL RINGBORG, a citizen of the United States, residing at Alexandria, in the county of Douglas and State of Minnesota, have invented certain new and useful Improvements in Foot-Propelled Sleds; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in foot-propelled sleds of that class adapted to be propelled by means of rotary motion supplied by foot-power in the same manner as the ordinary bicycle.

The objects of my invention are, first, to provide a sled of the class described that will be light, simple, and reasonably cheap of manufacture; second, that will enable the owner of a bicycle to utilize the same in the winter season by using the frame and the rear wheel thereof and, by adding thereto the runners and pulling-tire of the construction hereinafter described, to quickly convert the same into a sled; third, that will be capable of being propelled under favorable conditions at a speed equal to or even greater than the speed attained by a bicycle; fourth, that may be used upon any ordinary roadway where the snow is sufficiently packed for sleighing, upon the surface of the snow when covered by a crust, or upon the ice, and, fifth, that may be steered by means of the handle-bars, after the manner of a bicycle.

My invention consists in the particular construction of the runners and pulling-tire and their combination with the bicycle-frame and each other, all of which are shown in the accompanying drawings and described in the following specification.

In the drawings, Figure 1 is a side view.
Fig. 2 is a top plan view. Fig. 3 is an enlarged view of a section of the pulling-tire, partly in section, showing the manner of securing the ends and drawing them up to secure the tire upon the wheel-rim. Fig. 4 is a view of one of the ends of the pulling-tire, and Fig. 5 is a perspective view of the front runner.

A is the frame, which is of the construction of the ordinary bicycle, having the saddle C, the handle-bar D, the front fork B, and carrying the pedals $h$, the large sprocket $i$, the chain $j$, and the small sprocket $k$, with necessary axles and cranks. The wheel E is the ordinary bicycle-wheel, having the rim F; but in lieu of the rubber tire I provide the pulling-tire G, preferably of wood, having the pointed steel projections H placed in two rows around the outer circumference thereof. The manner of splicing and securing the pulling-tire G upon the rim F is illustrated in Figs. 3 and 4. Plates $a$, having thimbles $b$, are set into the ends of the pulling-tire, the thimbles entering openings bored therein to receive them. The thimbles are interiorly threaded, having, respectively, right and left hand threads. The plates $a$ are secured by means of the screws $c$. A screw $e$, having the square head $f$ in the center and having a right and left hand thread upon each end, enters the plates $a$ and screws into the like threaded thimbles $b$. A flat wrench may be inserted between the ends of the tire, and, engaging the head $f$, the screw $e$ may be turned in either direction, thereby tightening or loosening the tire upon the rim F, as may be desired.

The pointed steel projections H are provided with the threaded shanks $g$, which enter the tire G. The runners are lightly built of suitable material and are of considerable width to prevent their breaking through a light crust upon the snow. The front runner I has the split knee $m$, provided with openings $o$ at its highest point, which receive a pin $n$, said pin being adapted to pass through the regular openings in the lower ends of the front fork B. The split in the knee $m$ is spread sufficiently so as to just pass between the front forks, and the ends of the pin $n$ extend a sufficient distance beyond the outer sides of the front fork to admit of nuts $d$ being threaded thereon to hold the pin in place. The rear runners J are of similar construction to the front runners, but are each provided with a single knee $s$, having an opening at their highest point, through which the outer ends of the axle $t$ of the wheel E are adapted to pass, said outer ends being threaded to receive nuts $v$, which secure said knees upon the axle $t$. The front knee $m$ and the rear knees $s$ are each suitably secured to the runners I and J by means of rivets. The rear runners J are brought as close together as the width of the frame permits, as seen in Fig. 2. The height of the rear knees $s$ is sufficient to bring the outer circumference of the pulling-tire G on the same plane with the lower face of the runners J. Therefore the pointed projections H will extend below said lower faces, and as the wheel E is rotated by means of the sprocket wheel and chain they will engage the snow or ice, giving a hold which will prevent the slipping of said wheel and thereby cause the runners, which present less resistance, to slide forward.

In operation the movements of the rider are the same as in bicycle-riding, but on account of the smaller amount of resistance when used upon the snow-crust, a well-packed roadway, or upon smooth ice much less power is required than would be necessary to propel the bicycle, and at the same time a greater speed may be attained.

It will be seen that the pulling-tire G and the runners I and J may be manufactured at small cost, and by their use the ordinary bicycle may be quickly converted into a sled.

Having described my invention, what I claim, and desire to secure by Letters Patent of the United States, is—

1. In a foot-propelled sled of the class described, the combination with the bicycle-frame A, the runners I and J, the wheel E, having the rim F, and the removable pulling-tire G, having openings in the ends thereof, of the means for adjusting and securing said pulling-tire, consisting of the plates $a$, having the right-and-left-threaded thimbles $b$, said plates $a$, secured against the ends of said pulling-tire G with the thimbles $b$, entering the openings formed in the ends of said tire, said plates adapted to be connected by a right-and-left-threaded screw $e$, having a central head $f$, substantially as set forth.

2. In a foot-propelled sled, the combination with the rim F, of the wheel E, of a removable pulling-tire, having openings in the inner ends thereof, thimble-plates $a$, secured against said inner ends by the screws $c$, the thimbles $b$, formed integral with the plates $a$, and adapted to enter the openings in the inner ends of the tire, and provided with interior threads to receive a like threaded screw $e$, having a central head $f$, as set forth.

In testimony whereof I affix my signature in presence of two witnesses.

AXEL RINGBORG.

Witnesses:
   THEO. BORDSEN,
   FRED. VON BAUMHART.